United States Patent
Macken et al.

(10) Patent No.: US 6,504,987 B1
(45) Date of Patent: Jan. 7, 2003

(54) OPTICAL FIBER ORGANIZER

(75) Inventors: Luk Macken, Kessel-Lo (BE); Daniel Daems, 'S-Gravenwezel (BE); Hendrik Graulus, Veltem-Beisem (BE); Astrid Gysemans, Holsbeek (BE); Michel Vernimmen, Leopoldsburg (BE); Luiz Neves Mendes, Begijnendijk (BE)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/308,500

(22) PCT Filed: Nov. 18, 1997

(86) PCT No.: PCT/GB97/03157

§ 371 (c)(1),
(2), (4) Date: May 17, 1999

(87) PCT Pub. No.: WO98/22842

PCT Pub. Date: May 28, 1998

(30) Foreign Application Priority Data

Nov. 20, 1996 (GB) .............................................. 9624142
Nov. 5, 1997 (GB) .............................................. 9723355

(51) Int. Cl.$^7$ ................................................ G02B 6/00
(52) U.S. Cl. ...................................... 385/135; 385/134
(58) Field of Search ................................ 385/134, 135, 385/136, 137

(56) References Cited

U.S. PATENT DOCUMENTS

| 4,805,979 | A | | 2/1989 | Bossard et al. ............. 350/96.2 |
| 4,948,220 | A | | 8/1990 | Violo et al. ................. 350/96.2 |
| 5,740,298 | A | * | 4/1998 | Macken et al. ............. 385/135 |
| 5,751,882 | A | * | 5/1998 | Deams et al. ............... 385/135 |
| 6,112,006 | A | * | 8/2000 | Foss ........................... 385/135 |

FOREIGN PATENT DOCUMENTS

| EP | 0 584 600 A1 | 8/1993 | |
| WO | 91/08574 | 6/1991 | |
| WO | 95/07478 | 3/1995 | |
| WO | 95/07480 | 3/1995 | ............ G02B/6/38 |
| WO | 97/19377 | 5/1997 | ............ G02B/6/44 |

* cited by examiner

*Primary Examiner*—Frank G. Font
*Assistant Examiner*—Sang H. Nguyen
(74) *Attorney, Agent, or Firm*—Allen, Dyer, Doppelt, Milbrath & Gilchrist, P.A.

(57) ABSTRACT

An optical fiber organizer for organizing a plurality of uncut optical fibers of an optical fiber cable, comprising a plurality of optical fiber storage trays, the construction of the organizer being such that:

(a) the uncut optical fiber(s) of each single optical fiber circuit; or
(b) the uncut optical fibers of each single optical fiber cable element; may be stored separately from the optical fiber(s) of each other circuit or element, on respective individual storage trays.

21 Claims, 3 Drawing Sheets

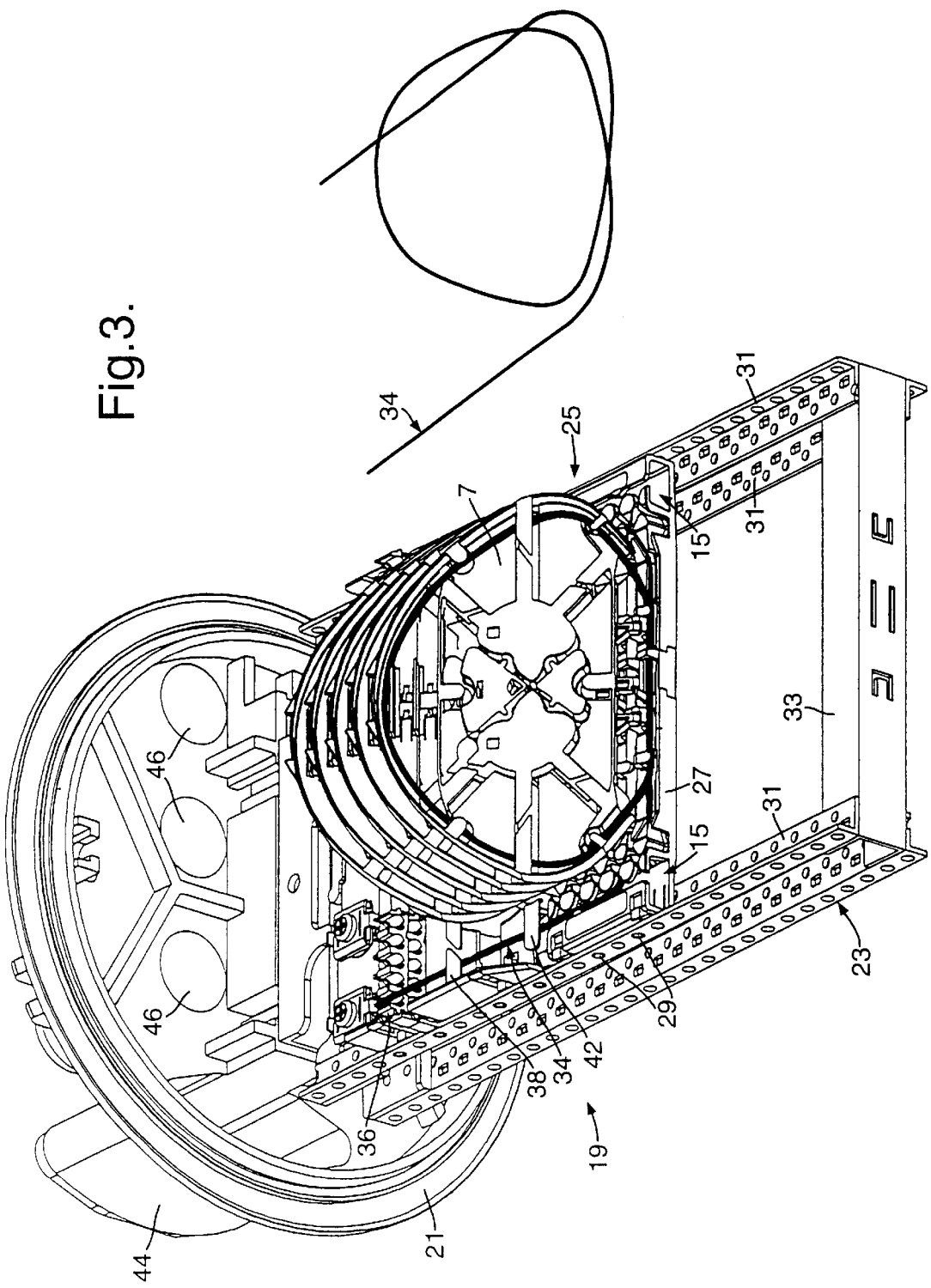

OPTICAL FIBER ORGANIZER

The present invention relates to the organization of optical fibres, e.g. in an optical fibre cable splice closure.

Many different designs of optical fibre organizer are known. For example, WO 95/07480 (Raychem) discloses a base for an optical fibre organizer, which comprises: a first passage along one longitudinal edge portion for incoming fibres; a second passage along an opposite longitudinal edge portion for outgoing fibres; a plurality of first fibre guides separated from one another along the length of the base and extending from the first passage across the base towards the second passage where fibres in said guides are directed away from the plane of the base; a plurality of second fibre guides separated from one another along the length of the base and extending from the second passage across the base towards the first passage where fibres in said guides are directed away from the plane of the base.

WO 95/25978 (Raychem) discloses an apparatus for arranging a plurality of stacks of optical fibre splice organizers in a closure, comprising a frame and at least two optical fibre splice organizer supports located on the frame, each organizer support being arranged to support a stack of organizers. The frame may be elongate and the organizer supports may each support a stack of organizers which extends laterally with respect to the frame. The organizer supports may be in one or more pairs, the supports of each pair being arranged back-to-back.

WO 95/07475 (British Telecom) discloses an optical fibre management system comprising a plurality of splice trays arranged in a stack. Each splice tray has a main body portion for holding at least one splice, and for storing fibres leading to the splice(s), and a fibre entry/exit portion for feeding fibre to/from the main body portion. Each tray is mounted in the stack so as to be movable from a stacked position, in which it is aligned with the other trays, to first and second operating positions in which the fibre entry/exit portion and the main body portion respectively are accessible. A related patent application, WO 95/07486 (British Telecom), discloses so-called "single circuit management" of spliced fibres or unspliced cut dark "customer" fibres. Single circuit management is the management of optical fibres by separating individual optical fibre circuits from each other.

GB-A-2305739 (Telephone Cables Limited) discloses an optical fibre splice tray which comprises a body with a plurality of splice holders at fixed locations. Fibre paths are provided on the body leading from fibre entry points to the splice holders. Hinged storage leaves are also mounted on the body.

According to a first aspect, the invention provides an optical fibre organizer for organizing a plurality of uncut optical fibres of an optical fibre cable, comprising a plurality of optical fibre storage trays, the construction of the organizer being such that:

(a) the uncut optical fibre(s) of each single optical fibre circuit; or (b) the uncut optical fibres of each single optical fibre cable element;

may be stored separately from the optical fibre(s) of each other circuit or element (as the case may be) on respective individual storage trays.

The invention also provides such an organizer in which the uncut optical fibres are (i.e. have been) so installed on the storage trays.

According to a second aspect, the invention provides a method of organizing a plurality of uncut optical fibres of an optical fibre cable, on an optical fibre organizer, the organizer comprising a plurality of optical fibre storage trays, the method comprising storing:

(a) the uncut optical fibre(s) of each single optical fibre circuit; or (b) the uncut optical fibres of each single optical fibre cable element;

separately from the optical fibre(s) of each other circuit or element (as the case may be) on respective individual storage trays.

By "uncut" optical fibres is meant optical fibres which enter and exit the organizer without being severed. Such fibres are sometimes referred to as "express" fibres, since they extend through the organizer without being spliced, connected or broken for any other reason. The invention has the advantage that, for the first time, it enables such uncut fibres to be stored in single circuits, or single cable elements (as the case may be). This is advantageous because the fibre(s) of individual circuits or cable elements which are not spliced to other fibres when the organizer is initially installed on the cable may later be spliced to other fibres without disturbing the uncut fibres of other circuits or cable elements (as the case may be). This vastly reduces the risk of accidentally introducing signal losses into the circuits, or cable elements, of other uncut fibres, or damaging the other uncut fibres, during the splicing procedure. The splicing of fibres which had initially remained uncut (and unspliced) is carried out, for example, when adding new subscribers, or new services, to the network.

In contrast with the present invention, the various optical fibre organizers disclosed in the prior publications mentioned earlier, are incapable of storing uncut fibres in single circuits or single cable elements. For example, the optical fibre management system disclosed in WO 95/07486 is able to store only severed optical fibres (i.e. spliced fibres or unspliced dark "customer" fibres). This is because the fibres which are stored in single circuits must have their ends threaded through openings which are closed in cross-section. Uncut fibres are instead retained bundled in their cable tubes which are in turn bundled together and looped around the so-called break-out tray. Similarly, the splice tray arrangement of GB-A-2305739 requires the optical fibre ends to be threaded through holes punched in the hinged leaves (see FIG. 5 of that document).

For the avoidance of doubt, it should be noted that a single circuit may, for example, comprise a single optical fibre or a pair of optical fibres, depending upon the transmission technique used. Also, a cable element is a defined group of optical fibres in a cable, for example a group of fibres from a single tube of the cable, or a group of fibres from a single slot of a slotted core cable.

In a preferred embodiment of the invention, the construction of the organizer is such that it comprises a plurality of optical fibre guides intended for uncut optical fibre(s), every one of which is open or openable in transverse cross-section, thereby permitting side-entry of the uncut optical fibre(s) into the guide.

The organizer may advantageously further comprise a support which comprises:

(i) a plurality of tray mounting means to which the optical fibre storage trays are attached, thereby mounting the trays on the support; and (ii) a plurality of guides for guiding the optical fibre(s), the or each said guide being open or openable in transverse cross-section, thereby permitting side-entry into the guide of optical fibre(s) extending from a respective optical fibre storage tray mounted on the support.

According to a third aspect, the invention provides an optical fibre organizer which comprises a support, the support comprising:

(i) one or more tray mounting means for attachment to at least one optical fibre storage tray, thereby to mount the tray on the support; and (ii) at least one guide for guiding at least one optical fibre, the or each said guide being open or openable in transverse cross-section thereby permitting side-entry into the guide of at least one optical fibre extending from a respective optical fibre storage tray mounted on the support.

The mounting means may be separate or separable from the guide(s). More preferably, however, the mounting means is/are integrally formed (e.g. moulded) with the guide(s).

According to a fourth aspect, the invention provides an optical fibre organizer which comprises a unitary support, the support comprising:

(i) one or more tray mounting means for attachment to at least one optical fibre storage tray thereby to mount the tray directly on the support; and (ii) a least one guide for guiding at least one optical fibre extending, in use, from an optical fibre storage tray mounted on the support.

The or each guide of the fourth aspect of the invention is preferably open or openable in transverse cross-section in use, thereby permitting side-entry into the guide of a least one optical fibre extending from a respective optical fibre storage tray mounted on the support.

The support preferably comprises a plurality of guides. Additionally or alternatively, the support may comprise a plurality of tray mounting means for attachment to a plurality of optical fibre storage trays thereby to mount the trays on the support. In preferred embodiments, therefore, the organizer comprises a plurality of said optical fibre storage trays, each of which is attached to at least one said tray mounting means, the trays thereby being mounted directly on the support.

The or each tray mounting means is preferably arranged with respect to at least one respective guide such that at least one optical fibre extending, in use, from a storage tray attached to one or more tray mounting means may be guided by the or each respective guide without the optical fibre being bent below its critical bend radius. Advantageously the or each guide may include at least one ramp arranged to guide at least one optical fibre between the guide and an optical fibre storage tray attached, in use, to the respective tray mounting means. The or each guide preferably includes at least two ramps, for example four ramps.

In preferred embodiments, each guide preferably comprises at least one groove in the support.

Each guide may advantageously be arranged such that at least part of it is substantially parallel to the or each optical fibre storage tray mounted, in use, on the support. Preferably, the support further comprises at least one routing means arranged substantially perpendicularly to this part of the or each guide, for routing one or more optical fibres from the guide(s) to the exterior of the support. The routing means may, for example, comprise at least one channel.

The support is preferably in the form of a plate.

The organizer most preferably comprises a plurality of supports, preferably attachable either directly or indirectly together side-by-side to form a larger support. Advantageously, this indirect attachment may be by means of a support frame to which the supports are attachable side-by-side to form a larger support.

According to a fifth aspect, the invention provides a kit of parts for forming an optical fibre cable closure, comprising an optical fibre organizer according to the previously mentioned aspects of the invention, and a casing for enclosing the optical fibre organizer. The casing preferably comprises a base containing cable ports, and a generally dome-shaped cover attachable to the base, the optical fibre organizer being attachable to the base.

The invention will now be described, by way of example, with reference to the accompanying drawings, of which:

FIG. 3 shows an assembled optical fibre organizer according to the invention attached to a base of a cable closure.

Figure 1A:
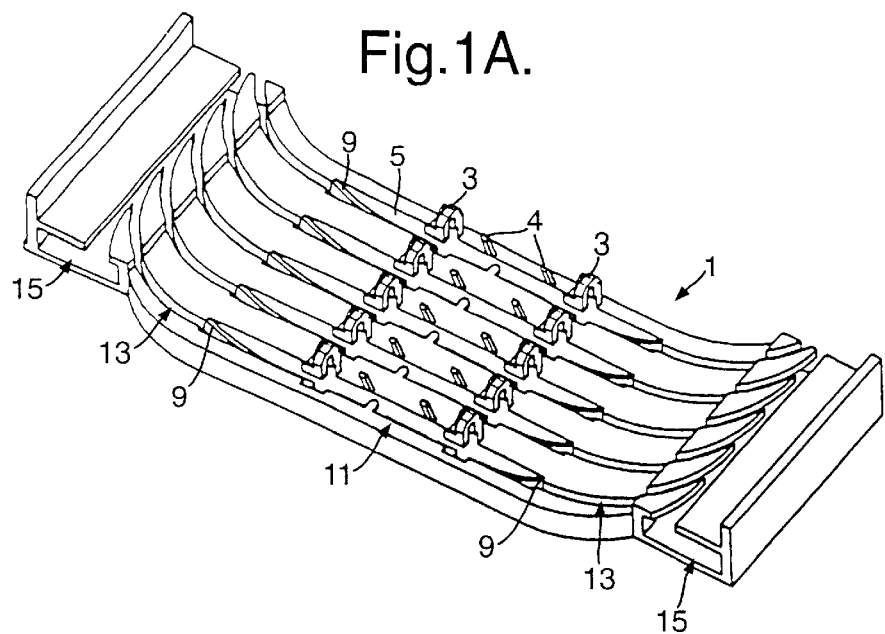
FIGS. 1A–1C show a support according to the invention, for hinged optical fibre storage trays.
Figure 1B:
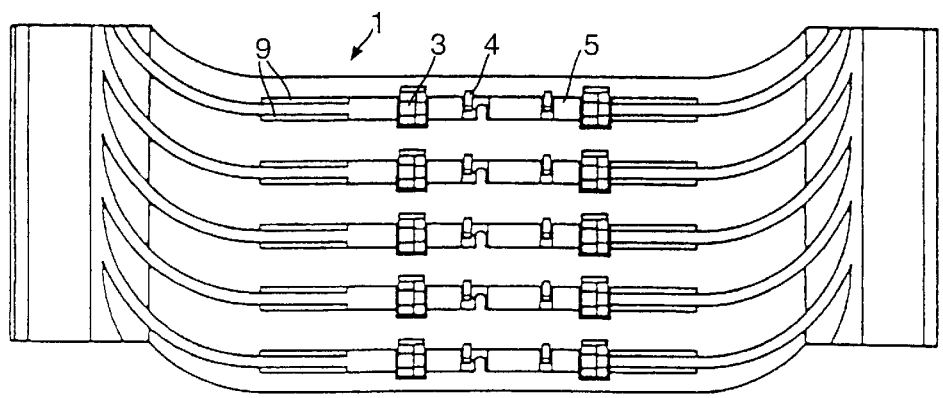
Figure 1C:
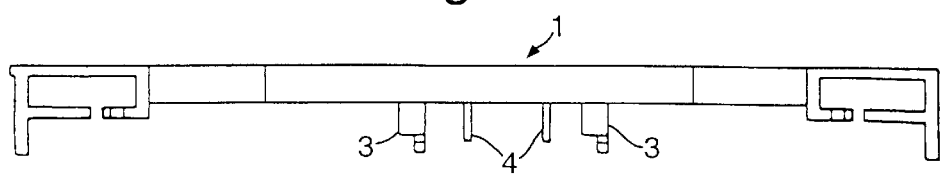

FIG. 1 shows a modular support plate 1 comprising a plurality of parts of mounting means 3 in the form of integral moulded protrusions standing up from the plate. The mounting means 3 contain apertures for receiving hinge pins formed on the storage trays. The storage trays are therefore hinged with respect to the support plate in use. Each of the trays may therefore be accessed by pivoting all of the trays on one side of the tray, away from the tray. FIG. 1 also shows flexible tines 4 (also protruding from the support plate) which lock the hinge pins of the trays in the mounting pins 3.

Each pair of mounting means 3 is associated with a respective guide 5 which is in the form of an open-sided groove in the plate. In use, an optical fibre storage tray 7 (see FIG. 3) is attached to a particular pair of mounting means 3, and one or more optical fibres or ribbons of optical fibres extending from the tray is received in the respective guide groove 5. Because the guide grooves 5 are open-sided, such optical fibres are inserted into them by "side-entry", i.e. without having to thread the fibres through an aperture. This has the advantage of enabling uncut (looped) optical fibres to be stored in the trays, for example in single circuits or single elements.

Each guide groove 5 includes four ramps 9 which, in use, guide one or more optical fibres or ribbons of optical fibres between the guide and its respective storage tray, i.e. the ramps guide the fibres away from the support plate towards the hinged tray mounted on the support plate. The ramps are situated in a relatively wide central region 11 of each guide. At each end 13 of the guide, the guide is narrower in width and is also curved in the plane of the support plate. At the ends of the guides, and extending substantially perpendicularly to the straight central regions of the guides, are optical fibre routing channels 15, for routing the optical fibres or ribbons from the guides 5 to the exterior of the organizer. An optical fibre, or a ribbon of optical fibres, may therefore extend from the exterior of the organizer (e.g. from a cable) along one routing channel 15 and into one end 13 of a respective guide 5. The fibre or ribbon may extend along the guide 5 across part of the width of the support plate and up one or both ramps into a storage tray mounted to the support plate (mounted by attachment to the respective mounting means 3). The fibre or ribbon may be looped one or more times in the storage tray, extend out of the tray and down the opposite ramps into the same guide 5. It will extend along the guide 5 past the first ramps out of the opposite end of the guide, into the other routing channel 15 and then to the exterior of the organizer.

When ribbons of optical fibres are used, the major width of the ribbons will generally be substantially perpendicular to the plane of the support plate in the routing channels 15 and the relatively narrow end regions 13 of the guides 5. However, in the relatively wide central regions 11 of the guides, the ribbons will normally twist through about 90° so that in the regions where they are guided towards the trays by the ramps 9 their major widths will generally be substantially parallel to the plane of the support. The dimension of the guides are preferably predetermined to cause or facilitate this change in the orientation of the ribbons which is required because optical fibre ribbons generally must not be bent about an axis which is perpendicular to their major width.

Figure 2A:
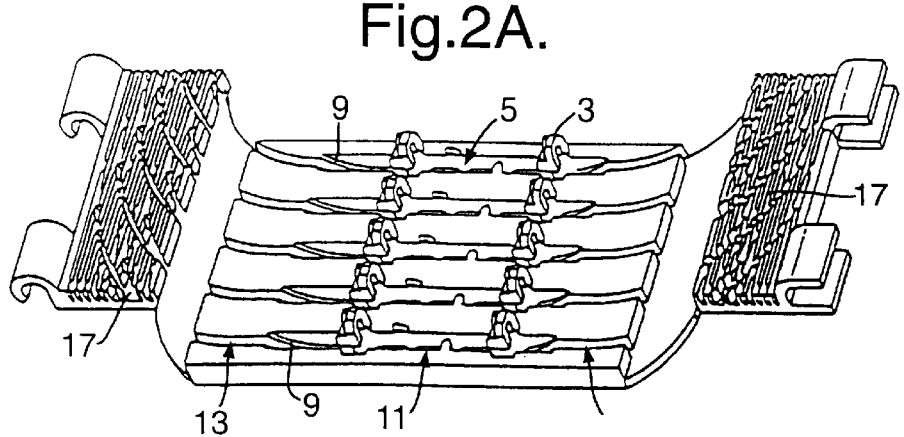
FIGS. 2A–2B show another support according to the invention, for hinged optical fibre storage trays.
Figure 2B:
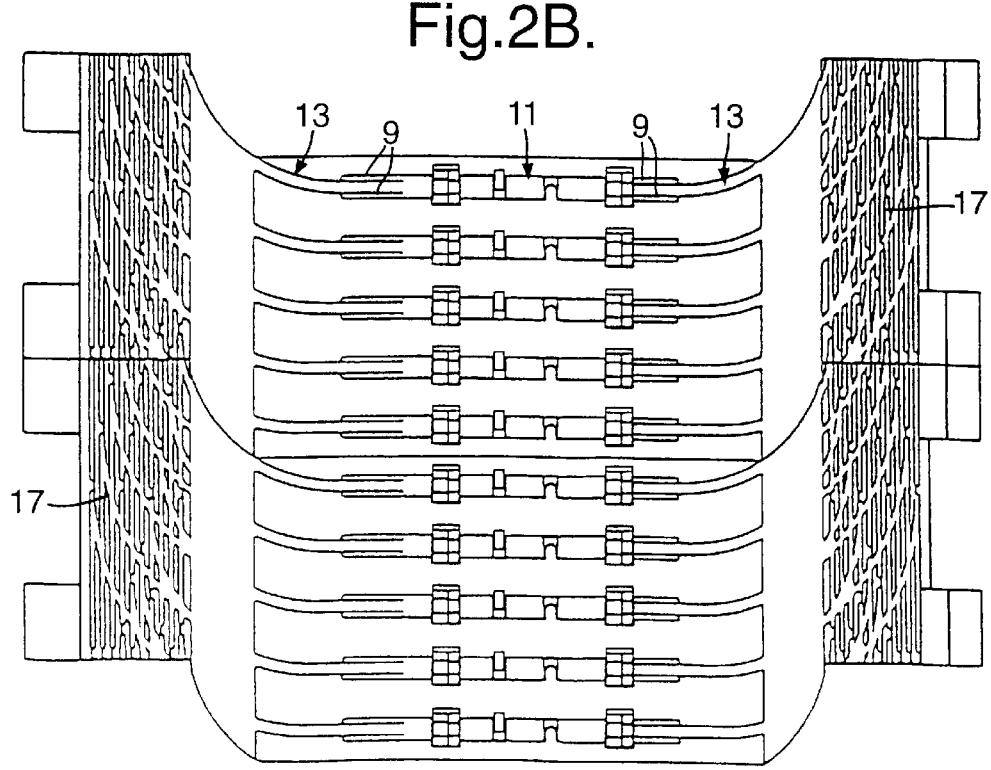

The support plates illustrated in FIGS. 2A and 2B are similar to the support plate illustrated in FIG. 1, except that the routing channels comprise a plurality of narrow channels 17 designed to route optical fibre ribbons orientated such that their major width is substantially perpendicular to the plane of the support plates. In FIG. 2B two support plates are arranged side-by-side, thereby forming a larger support plate.

FIG. 3 shows an optical fibre organizer 19 which has been assembled and attached to a base 21 of a cable closure. The organizer 19 comprises a support frame 23 and a storage module 25 attached to the support frame. The storage module 25 comprises a support plate 27 (of similar, but slightly different, design to the support plate shown in FIG. 1) supporting a plurality of hinged optical fibre storage trays 7. Each support plate 27 includes attachment devices 29 which are interlocked (by a snap-fit) with the support frame 23. The support frame 23 comprises two pairs of spaced-apart elongate parts 31 which are interconnected by an elongate cross-member 33. Each elongate part 31 is anchored to the base 21 of the closure.

The routing of the uncut optical fibre(s) of a single circuit or a single cable element, on the organizer, is shown schematically by means of a thick black line 34. The path of the optical fibre(s) 34 is also illustrated schematically adjacent to the organizer. (The path will be described with reference to a single fibre, for clarity). The fibre extends from the region of the organizer which is adjacent to the base 21 of the closure through open-sided guides 36, 38 and 42, and through the open-sided routing channel 15 on the support plate 27. The fibre then extends into an open-sided guide groove 5 (see FIGS. 1 and 2) in the support plate, and towards the opposite edge of the support plate. The fibre then extends into a storage tray 7 which is associated with that particular guide groove 5, it is looped one or more times in the tray (depending upon the length of fibre to be stored), and then extends out of the tray and back into the guide groove 5. The fibre extends along the guide groove 5 once more, and then extends out of the opposite end of the guide groove to that through which it entered. The fibre then extends along a routing channel 15 situated beyond this opposite edge of the guide groove back towards the base region of the cable closure.

An optical fibre cable (not shown) carrying the uncut optical fibres which are stored on the organizer in single circuits, or single elements (as the case may be) enters the cable closure through an oval port 44 in the base of the closure. In particular, a loop of the cable is fed through this port, and the optical fibres are exposed and organised as desired in the closure. Normally, some of the optical fibres will be cut and spliced to optical fibres from other cables which extend into the closure through cable ports 46. The splices and associated fibre lengths are also stored on respective storage trays 7, in single circuits, or single cable elements (as the case may be). The organizer, and cable closure, will therefore normally store both uncut (and therefore unspliced) and cut (and spliced) fibres, in single circuits or single cable elements.

What is claimed is:

1. An optical fiber organizer comprising:
    a plurality of storage trays organizing a plurality of uncut optical fibers of an optical fiber cable, each storage tray comprising a first optical fiber guide having an opening in a transverse cross-section for side-entry of at least one uncut optical fiber therein, the at least one uncut optical fiber being separate from the other plurality of uncut optical fibers; and
    at least one support plate connected to said plurality of storage trays, said at least one support plate comprising a plurality of second optical fiber guides, each second optical fiber guide having an opening in a transverse cross-section for side-entry of the at least one uncut optical fiber therein.

2. An optical fiber organizer according to claim 1, wherein each storage tray comprises connection means for connecting to said at least one support plate; and wherein said connection means is adjacent said first optical fiber guide.

3. An optical fiber organizer according to claim 2, wherein said connection means is arranged with respect to said first optical fiber guide such that the at least one uncut optical fiber is guided by said first optical fiber guide without being bent below a critical bend radius associated therewith.

4. An optical fiber organizer according to claim 1, wherein each second optical fiber guide comprises at least one ramp for guiding the at least one uncut optical fiber between said second optical fiber guide and said storage tray connected thereto.

5. An optical fiber organizer according to claim 4, wherein each second optical fiber guide comprises four ramps.

6. An optical fiber organizer according to claim 1, wherein each second optical fiber guide comprises at least one groove.

7. An optical fiber organizer according to claim 1, wherein each second optical fiber guide is substantially parallel to said respective storage tray connected thereto.

8. An optical fiber organizer according to claim 1, wherein said at least one support plate further comprises routing means substantially perpendicularly to said second optical fiber guide for routing the plurality of uncut optical fiber cables external to said at least one support plate.

9. An optical fiber organizer according to claim 8, wherein said routing means comprises at least one channel.

10. An optical fiber organizer according to claim 1, wherein said at least one support place comprises a plurality of support plates connected side-by-side to form a larger support plate.

11. An optical fiber organizer according to claim 1, further comprising a support frame connected to said at least one support plate.

12. An optical fiber organizer according to claim 1, further comprising a casing for enclosing the optical fiber organizer.

13. An optical fiber organizer according to claim 12, wherein said casing comprises:
    a base having at least one cable port for receiving the optical fiber cable, and wherein the optical fiber organizer is connected to said base; and
    a cover connected to said base.

14. A method of organizing a plurality of uncut optical fibers of an optical fiber cable, the method comprising the steps of:
    separating at least one uncut optical fiber from the plurality of uncut optical fibers using a storage tray comprising a first optical fiber guide having an opening in a transverse cross-section for side-entry of the at least one uncut optical fiber therein; and routing the at least one uncut optical fiber using a support plate connected to the storage tray, the support plate comprising a plurality of second optical fiber guides, each second optical fiber guide having an opening in a transverse cross-section for side-entry of the at least one uncut optical fiber therein.

15. A method according to claim 14, further comprising the step of connecting the storage tray to the support plate using connection means adjacent the first optical fiber guide.

16. A method according to claim 15, further comprising the step of guiding the at least one uncut fiber from the second optical fiber guide to the respective storage tray storage tray without being the at least one uncut optical fiber below a critical bend radius.

17. A method according to claim 14, wherein each support plate comprises at least one ramp; and the method further comprising the step of guiding the at least one optical fiber between the second optical fiber guide and the storage tray connected thereto using the at least one ramp.

18. A method according to claim 14, wherein each support plate further comprises channels substantially perpendicularly to the second optical fiber guide; and wherein the method further comprises the step of routing the plurality of uncut optical fiber cables external to the support plate via the channel.

19. A method according to claim 14, further comprising the step of connecting supports plates side-by-side to form a larger support plate.

20. A method according to claim 19, further comprising the step of connecting a support frame to the support plates connected side-by-side.

21. A method according to claim 14, further comprising:
connecting the optical fiber organizer to a base receiving the optical fiber cable; and
attaching a cover to the base.

* * * * *